(12) United States Patent
Kido et al.

(10) Patent No.: US 11,259,001 B2
(45) Date of Patent: Feb. 22, 2022

(54) STEREO IMAGE PROCESSING DEVICE

(71) Applicant: Hitachi Automotive Systems, Ltd., Hitachinaka (JP)

(72) Inventors: Hideaki Kido, Tokyo (JP); Takeshi Nagasaki, Hitachinaka (JP); Toshiyuki Aoki, Tokyo (JP)

(73) Assignee: Hitachi Astemo, Ltd., Hitachinaka (JP)

( * ) Notice: Subject to any disclaimer, the term of this patent is extended or adjusted under 35 U.S.C. 154(b) by 0 days.

(21) Appl. No.: 16/645,865

(22) PCT Filed: Jul. 27, 2018

(86) PCT No.: PCT/JP2018/028188
§ 371 (c)(1),
(2) Date: Mar. 10, 2020

(87) PCT Pub. No.: WO2019/058760
PCT Pub. Date: Mar. 28, 2019

(65) Prior Publication Data
US 2020/0267366 A1 Aug. 20, 2020

(30) Foreign Application Priority Data

Sep. 25, 2017 (JP) .............................. JP2017-183160

(51) Int. Cl.
*H04N 13/128* (2018.01)
*H04N 13/167* (2018.01)
(Continued)

(52) U.S. Cl.
CPC ......... *H04N 13/128* (2018.05); *H04N 13/167* (2018.05); *H04N 13/239* (2018.05);
(Continued)

(58) Field of Classification Search
CPC .. H04N 13/167; H04N 13/128; H04N 13/239; H04N 2013/0085; H04N 2013/0081
(Continued)

(56) References Cited

U.S. PATENT DOCUMENTS

| 2012/0236124 A1* | 9/2012 | Aoki | H04N 13/239 348/47 |
| 2014/0198184 A1* | 7/2014 | Stein | H04N 5/232 348/47 |
| 2015/0271567 A1* | 9/2015 | Michot | H04N 13/239 348/47 |

FOREIGN PATENT DOCUMENTS

| JP | 2002-145072 A | 5/2002 |
| JP | 2004-32244 A | 1/2004 |

(Continued)

OTHER PUBLICATIONS

International Search Report (PCT/ISA/210) issued in PCT Application No. PCT/JP2018/028188 dated Oct. 23, 2018 with English translation (four (4) pages).
(Continued)

*Primary Examiner* — Thai Q Tran
*Assistant Examiner* — Nienru Yang
(74) *Attorney, Agent, or Firm* — Crowell & Moring LLP

(57) ABSTRACT

In order to improve parallax accuracy and output an accurate distance, this stereo image processing device is provided with: a stereo image capture unit that captures a plurality of images with different viewpoints; a synchronization unit that synchronizes image capture times when the plurality of images are captured; image correction units that parallelize and output the plurality of images captured by the stereo image capture unit; a parallax measurement unit that detects parallax on the basis of the images outputted by the image correction units; and an object detection unit that detects an object on the basis of the parallax measured by the parallax
(Continued)

measurement unit, and is further provided with delay amount holding units that each hold, pixel by pixel, delay times from the image capture times synchronized by the synchronization unit, and an object parallax correction unit that corrects the parallax of the object detected by the object detection unit on the basis of the delay times held by the delay amount holding units.

8 Claims, 7 Drawing Sheets

(51) Int. Cl.
     *H04N 13/239*     (2018.01)
     *H04N 13/00*     (2018.01)

(52) U.S. Cl.
     CPC ............... *H04N 2013/0081* (2013.01); *H04N 2013/0085* (2013.01)

(58) Field of Classification Search
     USPC .......................................................... 348/47
     See application file for complete search history.

(56) References Cited

FOREIGN PATENT DOCUMENTS

| | | |
|---|---|---|
| JP | 2012-198075 A | 10/2012 |
| JP | 2016-514246 A | 5/2016 |

OTHER PUBLICATIONS

Japanese-language Written Opinion (PCT/ISA/237) issued in PCT Application No. PCT/JP2018/028188 dated Oct. 23, 2018 (three (3) pages).

\* cited by examiner

STEREO IMAGE PROCESSING DEVICE

TECHNICAL FIELD

The present invention relates to a stereo image processing device.

BACKGROUND ART

In recent years, the demand for various recognition functions for safe driving and automatic driving has increased due to the widespread use of in-vehicle camera devices that are image recognition devices that recognize objects on the basis of captured images. Among them, since the stereo camera device, which detects an object using two cameras disposed on left and right sides, simultaneously measures visual information through the images and information on a distance to the object, various objects (people, cars, solid objects, road surfaces, road surface signs, signboard signs, and the like) around the car can be grasped in detail, and it is said to contribute to the improvement of safety during driving assistance.

The stereo camera calculates a distance from the difference between the positions of the same object imaged by the left and right cameras. This difference is called parallax. The farther the distance, the smaller the parallax, and the closer the distance, the greater the parallax. When the parallax is d and the distance is Z, the relationship between the parallax and the distance is inversely proportional and is illustrated as follows.

$$Z=\alpha/d$$

However, $\alpha$ is a value unique to the camera, and is calculated as $\alpha=fB/c$ from the focal length (f) of the lens, the physical size (c) of the pixel, and the base length (B) of the distance between the cameras.

In the stereo camera, it is necessary to perform imaging in a state where the times of cameras are synchronized. In a case where imaging is performed in a state where the cameras are out of sync, that is, in a state where a time delay occurs in one camera, incorrect parallax is observed for an object moving in the lateral direction, for example. As a result, the distance to the object is estimated incorrectly. This tendency is particularly noticeable in a method of imaging with a rolling shutter. This is because the rolling shutter sequentially performs imaging for each line of an image, so that a time delay occurs between the lines.

In order to avoid the time lag, there is an example having a time synchronization function at the time of imaging by cameras as in PTL 1. Sending a synchronization signal to both cameras synchronizes the image capture time. PTL 2 discloses a technique for synchronizing cameras with different angles of view using a rolling shutter.

CITATION LIST

Patent Literature

PTL 1: JP 2002-145072 A
PTL 2: JP 2016-514246 A

SUMMARY OF INVENTION

Technical Problem

Both PTLs 1 and 2 describe the synchronization mechanism required for imaging by the stereo camera, but do not describe an erroneous measurement of the parallax occurring in a case where the camera (particularly, the rolling shutter system) has a large lens distortion.

The erroneous measurement of the parallax at the time of using the rolling shutter is a problem caused by the lens distortion in the left and right cameras. If the line in which the same object is captured is different between the left and right cameras and the deviation amount of the lines differs depending on the distance to a subject, the image capture time for the same object differs between the left and right cameras, and thus there is a problem in that the parallax is incorrectly estimated.

Solution to Problem

In order to solve the problem, there is provided a stereo image processing device including a stereo image capture unit that captures a plurality of images with different viewpoints; a synchronization unit that synchronizes image capture times when the plurality of images are captured; image correction units that parallelize and output the plurality of images captured by the stereo image capture unit; a parallax measurement unit that detects parallax on the basis of the images output by the image correction units; an object detection unit that detects an object on the basis of the parallax measured by the parallax measurement unit; delay amount holding units that each hold, pixel by pixel, delay times from the image capture times synchronized by the synchronization unit; and an object parallax correction unit that corrects the parallax of the object detected by the object detection unit on the basis of the delay times held by the delay amount holding units.

Advantageous Effects of Invention

According to the invention, it is possible to improve parallax accuracy and output an accurate distance.

DESCRIPTION OF EMBODIMENTS

Figure 1:
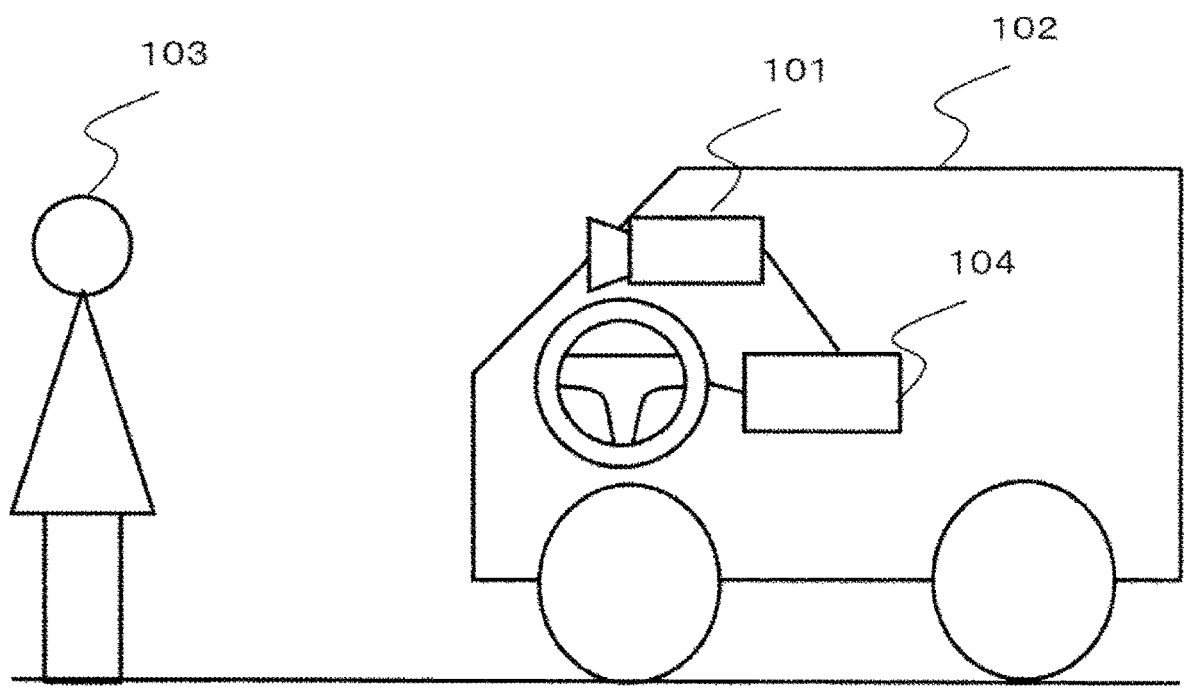
FIG. 1 is a diagram illustrating a configuration of an in-vehicle stereo camera.

A vehicle control system using a stereo camera is illustrated in FIG. 1. A stereo camera (stereo image capture unit) 101 is mounted on a vehicle 102, and measures, for example, a distance to an object 103 ahead and a relative speed to transmit the measured distance and relative speed to a vehicle control unit 104. The vehicle control unit 104 controls the vehicle by determining a brake or accelerator control from the distance to the object and the relative speed.

Figure 2:
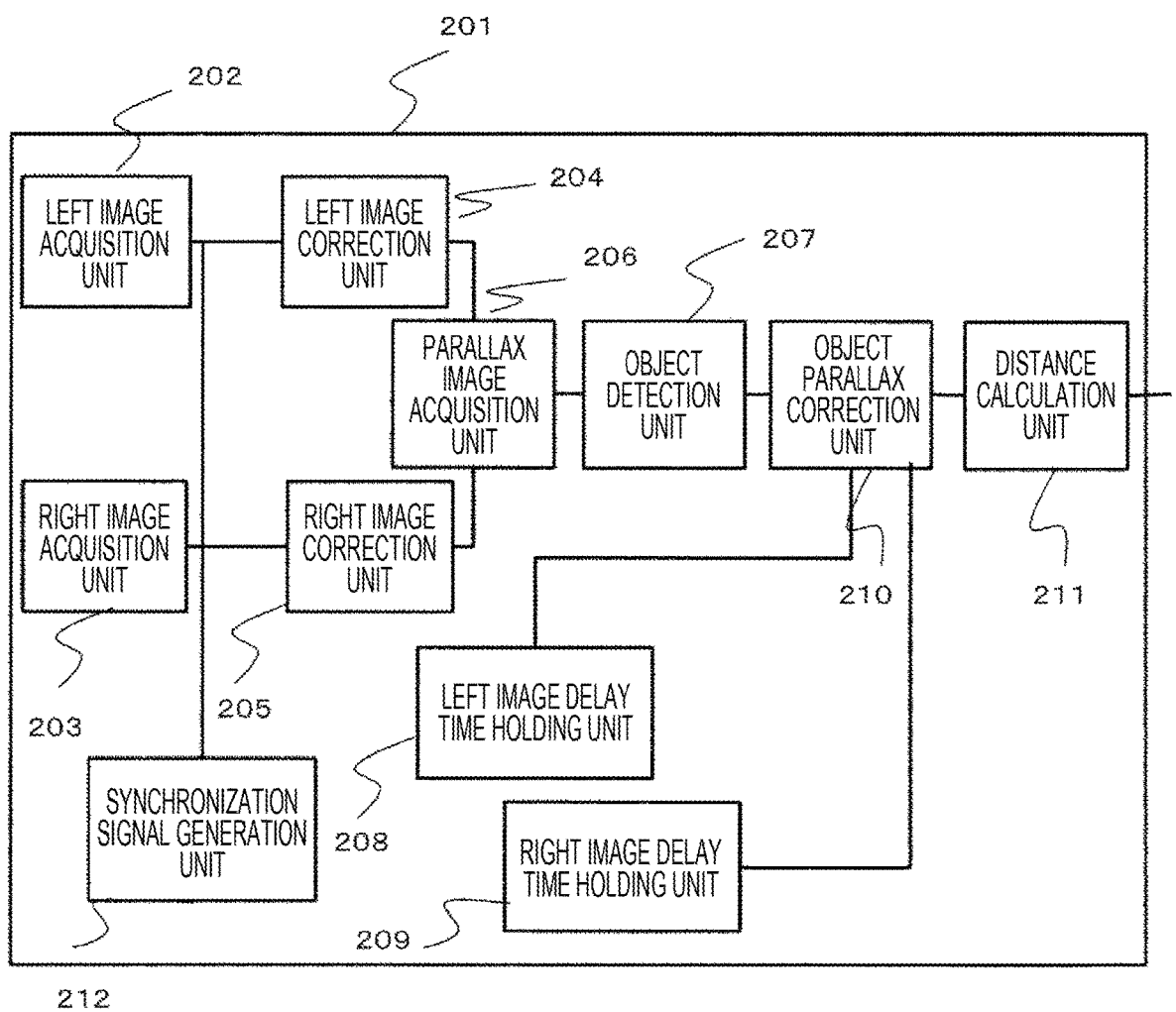
FIG. 2 is a diagram illustrating a configuration of a stereo camera that corrects parallax on the basis of solid object detection.

A first embodiment of the stereo image processing device is illustrated in FIG. 2. A stereo camera 201 includes imaging units on left and right sides, and a left image acquisition unit 202 and a right image acquisition unit 203 acquire a pair of images.

In addition, the stereo camera includes a left image correction unit (image correction unit) 204 and a right image correction unit (image correction unit) 205 which perform distortion correction and parallelization of the images.

Further, the stereo camera includes a parallax image acquisition unit (parallax measurement unit) 206 that specifies the position where the same object is shown in the parallelized left and right images, and calculates a difference in position between the left and right images as parallax to obtain a parallax image for each image coordinate. In the parallax image obtained here, incorrect parallax may be measured when an object with a relatively high lateral speed is imaged, particularly when the host vehicle is turning.

An object detection unit 207 detects a solid object or the like from the acquired parallax image.

An object parallax correction unit 210 has a function of estimating and correcting a disparity amount of the parallax from information on the delay time obtained from a left image delay time holding unit (delay amount holding unit) 208 and a right image delay time holding unit (delay amount holding unit) 209. A distance calculation unit 211 calculates the distance and relative speed of the object in the outside world from the information corrected in this way, and transmits it to the outside of the stereo image processing device. A synchronization signal generation unit (synchronization unit) 212 has a function of matching the acquisition timing and the imaging timing of the left and right images, so that it is possible to start to capture the left image and the right image at the same timing.

Next, a flow from the image acquisition will be specifically described.

Figure 3:
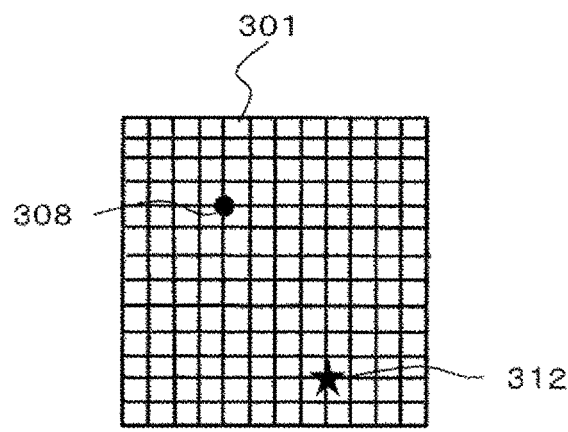
FIG. 3 is a diagram illustrating an image captured by a stereo camera.
Figure 3:
Figure 3:
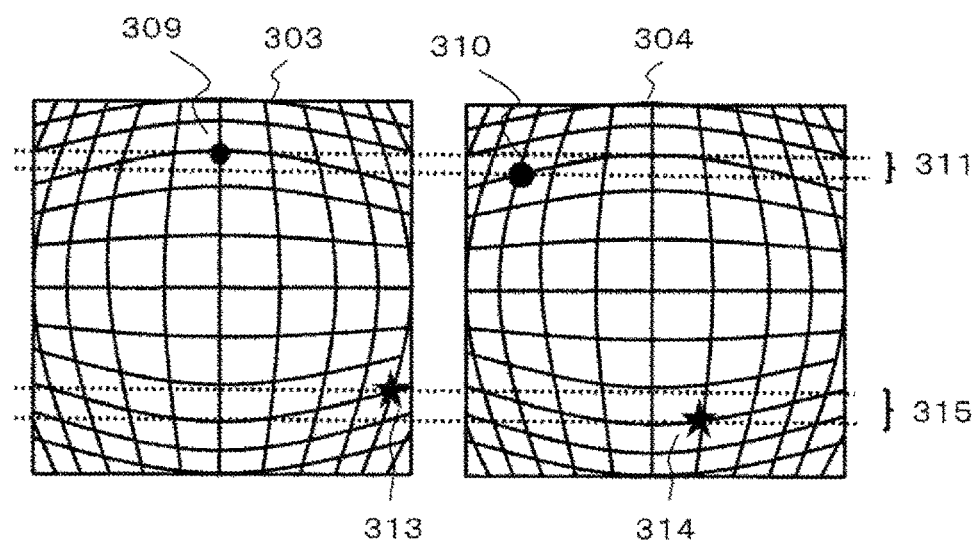
Figure 3:
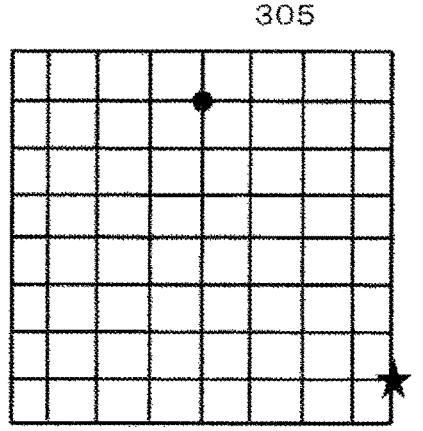
Figure 3:
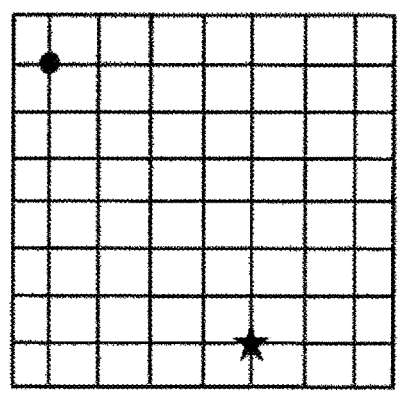

The image data acquired by the left image acquisition unit 201 and the right image acquisition unit 202 is imaged by particularly a wide-angle lens with a lens distortion. An example is illustrated in FIG. 3. A lattice-patterned plate 301 is imaged by a stereo camera 302. The acquired image has a barrel distortion as in a left image before correction 303 and a right image before correction 304. Such a lens distortion is corrected by the left image correction unit 204 and the right image correction unit 205 that correct the parallax image, and is corrected so that the distortion is eliminated from the lattice pattern as in a corrected left image 305 and a corrected right image 306.

Here, in an end region where the distortion is particularly large, the same object is imaged on different lines when the left and right images are compared. A point 308 on the plate 301 is imaged as points 309 and 310 in the left image before correction and the right image before correction, respectively, but as indicated by a broken line width 311, the same object is imaged on different lines between the left image before correction and the right image before correction.

Similarly, a star 312 on the plate 301 is also imaged as points 313 and 314 in the left image before correction and the right image before correction, respectively, and the stars are also imaged on different lines between the left and right images as indicated by a broken line width 315.

The fact that the imaging lines are different means that the image capture times are different in a rolling shutter system camera. The amount of time lag varies depending on the position of the object as can be seen from the different widths indicated by the broken line widths 311 and 315, and also varies depending on the distance to the object. In a case where the image capture times are different, when comparing a case (A) in which the object does not relatively move laterally with a case (B) in which the object moves laterally, the parallax between the left and right images includes an error in the case (B) even in case of having the same depth distance. If the parallax includes an error, an incorrect distance is calculated in Formula 1.

The images corrected as the images 305 and 306 by the left image correction unit 204 and the right image correction unit 205 are converted into parallax images by the parallax image acquisition unit 206. Since the left and right images are captured at different timings on the left and right sides, for an object with a relatively high lateral speed, the parallax is measured with an error.

This parallax error can be described as follows, assuming that the host vehicle does not move in the lateral direction, the lateral speed of the object in the real world is vx, and the acquisition time lag between the left and right images is dly.

$$fB/c * vx * dly \qquad \text{(Formula 1)}$$

Here, the lateral speed on the image is written as vi, and is rewritten as $$vi * dly \qquad \text{(Formula 2).}$$

dly is a relative amount of time lag between the left and right images, and depends on the position of the pixel, and thus the formula can be rewritten as follows using the acquisition time lag of the right image and the acquisition time lag of the left image.

$$dly = sR(x,y) - sL(x+d(x,y),y) \qquad \text{(Formula 3)}$$

Here, sR indicates the acquisition time lag from the reference time of the right image when the image coordinates after parallelization are x and y, and sL indicates the acquisition time lag from the reference time of the left image at x and y. d(x,y) indicates the displacement of the lateral position of the left and right images at the point where the same object is imaged, that is, the observed parallax itself. Thus, the original parallax D(x,y) can be written as follows by summarizing the above formulas.

$$D(x,y) = d(x,y) - vi * (sR(x,y) - sL(x+d(x,y),y)) \qquad \text{(Formula 4)}$$

In the correspondence between (Formula 4) and FIG. 2, the left image delay time holding unit 208 holds sL(x,y), and the right image delay time holding unit 209 holds sR(x,y).

Next, means for realizing the delay time holding unit will be described.

The left image delay time holding unit 208 and the right image delay time holding unit 209 hold the time when the coordinates x and y are captured from a certain synchronized time. This time can be obtained, for example, as follows.

The left image before correction and the right image before correction acquired from imaging means are set as L'(x1,y1) and R'(x2,y2), respectively. These are the image coordinates before the parallelization process is performed. The conversion from the left image before correction L' to the corrected left image L is usually expressed by some mathematical formulas or a table in which input coordinates and output coordinates are associated with each other. For example, this mapping or conversion formula is expressed as $$x = fL\_x(x1,y1), y = fL\_y(x1,y1) \qquad \text{(Formula 5).}$$

The imaging start timing of the image before correction acquired from the imaging means is set as T0, and the imaging timing at the position (x1,y1) of the image before correction is set as TL(x1,y1). In a case where imaging is performed linearly for each line, this timing is expressed as $$TL(x1,y1)=T0+\alpha*y1+\beta x1 \quad \text{(Formula 6)}.$$

In other words, the delay time ΔL(x1,y1) from T0 is expressed as $$\Delta L(x1,y1)=\alpha*y1+\beta*x1 \quad \text{(Formula 7)}.$$

Here, α and β are appropriate coefficients, α is a time required to image one line of the image before correction, and β is a time required to image one pixel.

If the coordinates (x,y) of the corrected image are determined, the position of the coordinates (x1,y1) of the image before correction is uniquely determined from (Formula 5) and (Formula 6), so the delay time in each coordinate from T0 can be estimated.

Although the above description has been about the relationship between the left image before correction and the corrected left image and the delay time acquisition means, the same applies to the right image. A common value between the right image before correction and the left image before correction is the imaging start timing T0, which is equivalent to synchronizing the imaging timings of the left and right images.

As a method for realizing fL_x and fL_y in (Formula 5), first, a reference table in which the pixels of the input image and the pixels of the output image are associated one-to-one is considered. In general, a point at certain coordinates of the input image is associated with one point of the image coordinates of the output image. In this case, even a very complicated lens distortion can be expressed. By using this reference table, a delay amount used in delay amount holding means can be calculated through a conversion formula such as (Formula 7). The calculation of the delay amount may be calculated every time from the calculation table, or only the calculation result may be recorded.

Next, a method using a generally known model formula is also considered. For example, in a lens having a large distortion, orthographic projection, equidistant projection, equisolidangle projection, stereo projection, or the like is considered as a projection model. For this reason, it is conceivable to use a model formula corresponding to each projection method. In a lens having a little distortion, for example, the following formula is generally used.

$$x=(1+k1*r^2+k2*r^4)x1$$

$$y=(1+k1*r^2+k2*r^4)y1$$

However, $r^2=x1*x1+y1*y1$, and k1 and k2 are variables for determining the degree of the distortion.

Since the reference table method requires one-to-one correspondence for each pixel, basically, it is required to record the input position for all of the output pixels, and thus a large memory capacity is required. However, in case of the model formula, the memory capacity can be small because it is sufficient to store the parameters expressed by the model.

In a case where the delay time depends on the setting of the imaging means such as a shutter speed, the dependency can be eliminated by having (Formula 7) for each shutter time. In a camera that images the outside world, it is natural to change the shutter speed in accordance with the outside environment. Therefore, it is possible to obtain a correct correction by changing the coefficient in (Formula 7) according to the shutter speed that is currently used by the camera.

Next, a method of parallax correction means will be described.

According to the correction formula in (Formula 4), d is an observed value and sR and sL are fixed values, so d, sR, and sL are known variables, but D and vi are unknown variables, and therefore D cannot be derived directly from one formula.

Figure 4:
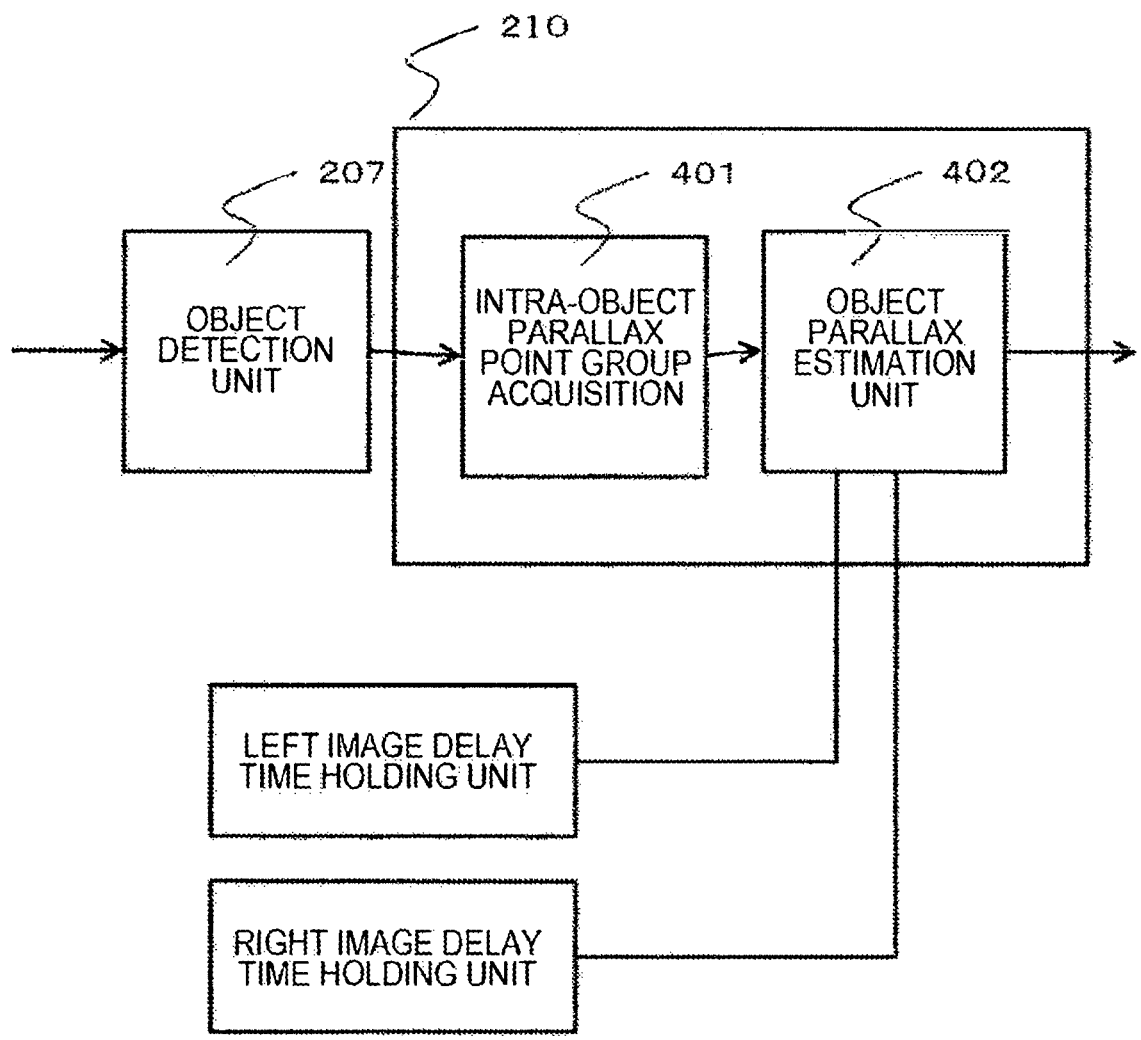
FIG. 4 is a diagram illustrating a configuration for correcting parallax on the basis of solid object detection.
Figure 4:
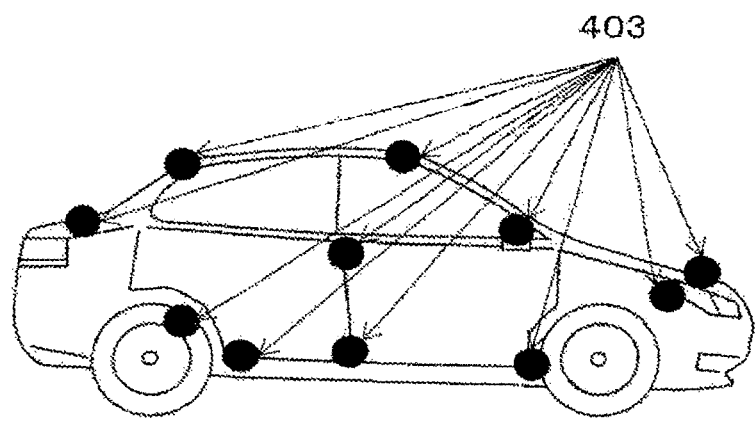

In order to obtain D, for example, correction means as illustrated in FIG. 4 is considered. In FIG. 4, first, the object detection unit 207 extracts an object. The extraction of the object can be performed by collecting pixels having the same parallax, and the means is not limited. One object is usually composed of several to tens of thousands of pixels. Assuming that one object has the same lateral speed (vi) and parallax (D), it is possible to construct a plurality of formulas with sample points for the two unknown variables of (Formula 4). Therefore, it becomes an overdetermined system, and the lateral speed vi and the parallax D of the object can be obtained by solving an optimization problem such as the least square method from the information of each sample point. The sample points used in the least square method may be selected from points with high reliability. In FIG. 4, an intra-object parallax point group acquisition unit 401 acquires (sample) point groups 403 of the parallax belonging to the object detected by the object detection unit 207, and an object parallax estimation unit 402 obtains and outputs the parallax D of the object by solving the above problem.

In addition to the correction by the object detection as in FIG. 1, it is conceivable to directly correct the parallax image. In this case, if all the objects in the outside world are assumed to be stationary objects, or if it can be assumed that the movement in the lateral direction by the host vehicle on the image is much larger than the movement of the object, the parallax image can be directly corrected using the vehicle information. Here, the vehicle information may be information such as a steering angle, a yaw rate, and a speed sensor mounted on the host vehicle. The vehicle information may be acquired by a movement information acquisition unit (not illustrated) of the stereo camera 101 or the vehicle on which the stereo camera 101 is mounted.

Second Embodiment

Figure 5:
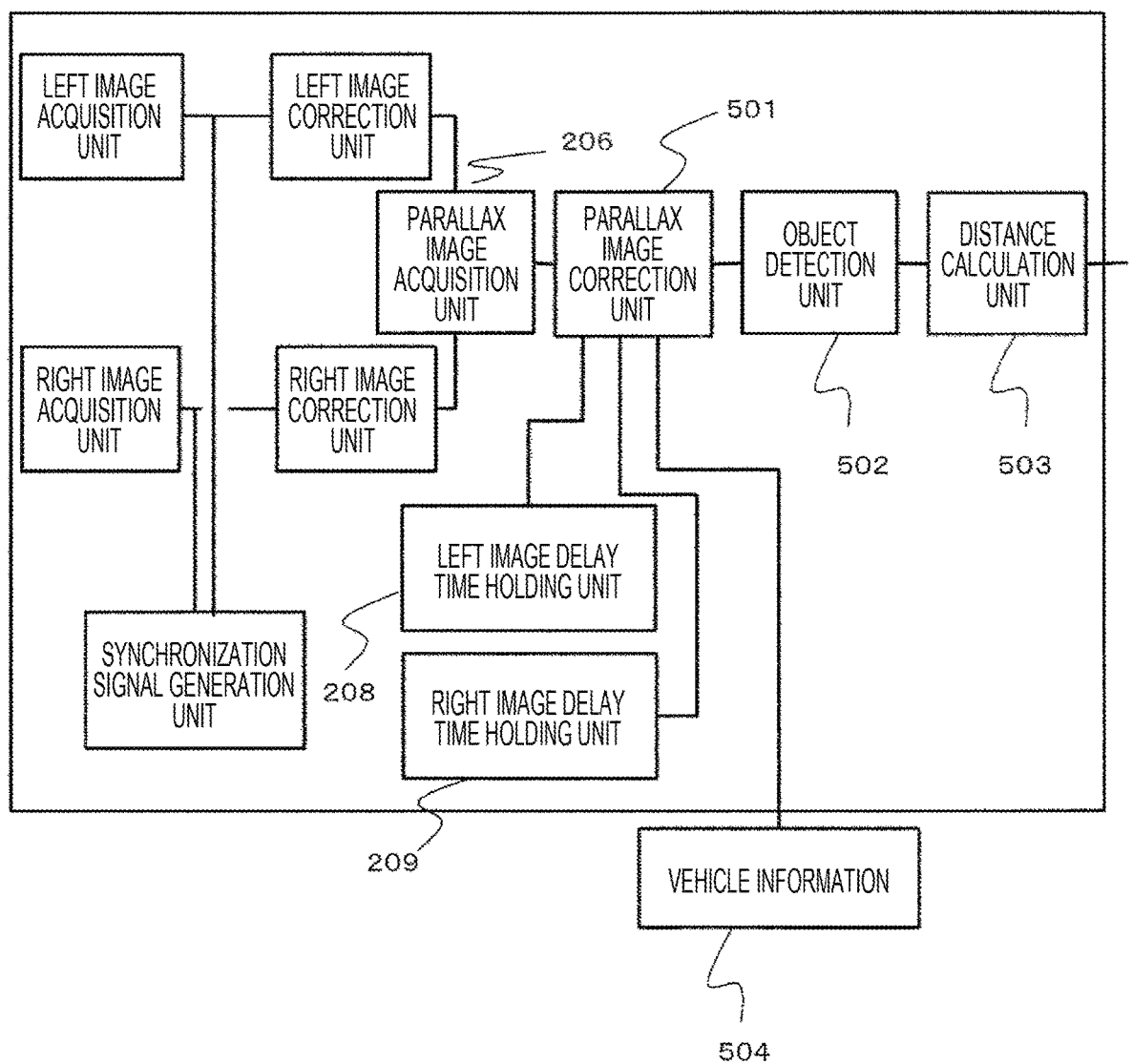
FIG. 5 is a diagram illustrating a configuration of a stereo camera that corrects a parallax image on the basis of vehicle information.

Next, a second embodiment of the stereo image processing device is illustrated in FIG. 5. In this configuration, the process from imaging to creation of a parallax image is the same as in FIG. 2. In this embodiment, a parallax image correction unit 501 is provided. The parallax image correction unit 501 corrects a parallax image by using vehicle information 504 such as a steering angle, a vehicle speed, and a yaw rate together with the left image delay time holding unit 208 and the right image delay time holding unit 209 for the image acquired by the parallax image acquisition unit 206. Using the corrected parallax image, an object detection unit 502 detects an object such as a solid object, and a distance calculation unit 503 outputs each distance.

Figure 6:
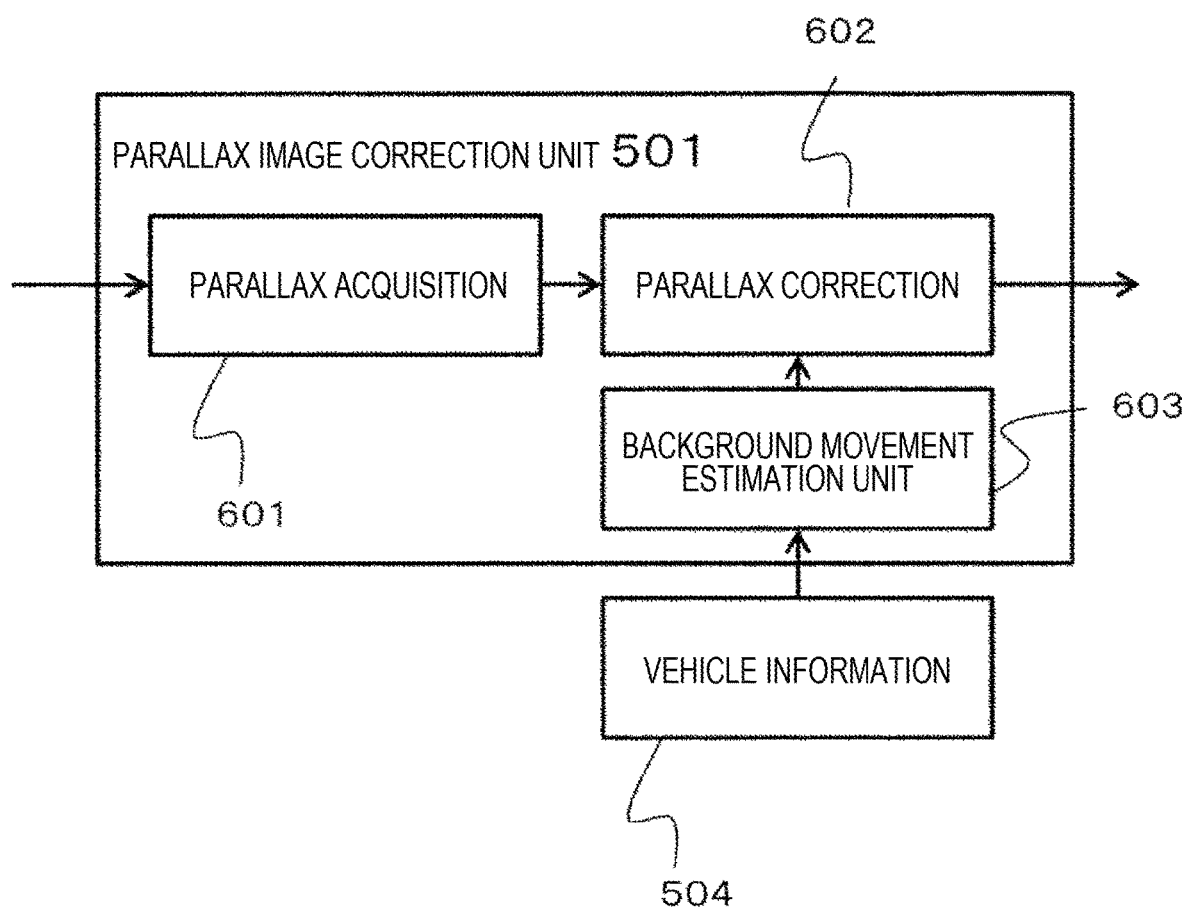
FIG. 6 is a diagram illustrating a configuration for correcting a parallax image on the basis of vehicle information.

Details of the parallax image correction unit 501 will be described below. In a case where it is assumed that the object is a stationary object, only the movement of the host vehicle affects the movement of the object on the image. This realization method is illustrated in FIG. 6. First, the parallax is acquired from the parallax image (parallax acquisition 601). Next, the movement information of the stationary object is estimated (background movement estimation unit 602) on the basis of the vehicle information 504 such as a steering angle, a yaw rate, and a speed sensor, and parallax correction 603 is performed. It is assumed that the angular velocity in the yaw direction of the vehicle is estimated to be θ by a stationary object movement information estimation unit. At this time, the movement of the object in the outside world on the image is approximated by $$vi=fBθ/(cD(x,y)) \quad \text{(Formula 8)}.$$

Substituting (Formula 8) into (Formula 4) yields a quadratic equation for D as follows.

$$D^2-dD+fBθ/c*(sR(x,y)-sL(x+d,y))=0 \quad \text{(Formula 9)}$$

However, the coordinates (x,y) concerning D and d are omitted.

From here, it is possible to calculate the parallax at the point (x, y) by solving the quadratic equation under the condition of D>0. The parallax corrected in this way is output as new parallax information. Thus, the parallax image correction unit 501 can correct the parallax.

However, if the above correction is performed in a case where the movement of the vehicle is small, an erroneous correction may occur. Therefore, it is conceivable to perform the above processing only in a case where the movement of the vehicle is large.

Figure 7:
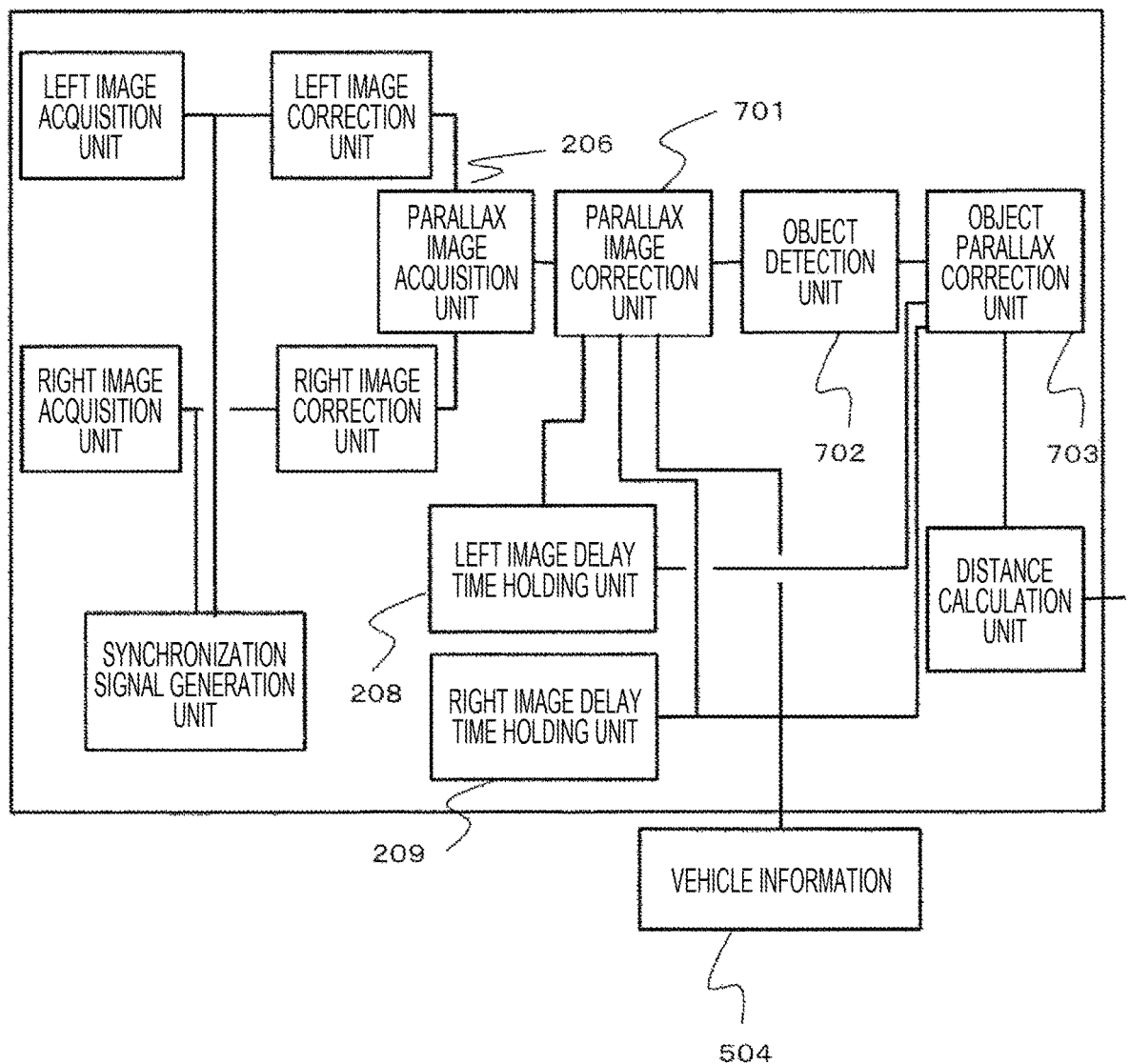
FIG. 7 is a diagram illustrating a configuration of a stereo camera that corrects parallax on the basis of vehicle information and solid object detection.

A method of correcting the parallax by combining the configurations of FIGS. 2 and 5 is also conceivable. The configuration in this case is illustrated in FIG. 7.

A parallax image correction unit 701 corrects the image acquired by the parallax image acquisition unit 207 using the information of the vehicle information 504. Next, on the basis of the correction, object detection (703) is performed, and the object parallax correction unit 703 corrects the parallax of the object to outputs a distance (704). However, the lateral speeds assumed by the parallax image correction unit 701 and the object parallax correction unit 703 are different from each other, with the former being the speed accompanying the movement of the host vehicle and the latter being the speed accompanying the movement of the opponent. The vehicle information 504 may be acquired by the movement information acquisition unit (not illustrated) of the stereo camera 101 or the vehicle on which the stereo camera 101 is mounted.

It can be expressed as follows on the basis of the above embodiments.

There are provided a stereo image capture unit 101 that captures a plurality of images with different viewpoints; a synchronization unit 212 that synchronizes image capture times when the plurality of images are captured; image correction units 204 and 205 that parallelize and output the plurality of images captured by the stereo image capture unit 101; a parallax measurement unit 206 that detects parallax on the basis of the images output by the image correction units 204 and 205; and an object detection unit 207 that detects an object on the basis of the parallax measured by the parallax measurement unit 206. There are further provided delay amount holding units 208 and 209 that each hold, pixel by pixel, delay times from the image capture times synchronized by the synchronization unit 212; and an object parallax correction unit 210 that corrects the parallax of the object detected by the object detection unit 207 on the basis of the delay times held by the delay amount holding units 208 and 209.

Further, the stereo image capture unit is a rolling shutter system, and the object parallax correction unit corrects a parallax measurement error accompanying the lateral speed of the object detected by the object detection unit.

In addition, the object parallax correction unit considers that the parallax point groups detected by the object detection unit have the same lateral speed.

Further, the delay amount holding unit performs calculation on the basis of the output of the image correction unit.

Further, there is provided a stereo image processing device including a stereo image capture unit that captures a plurality of images with different viewpoints; a synchronization unit that synchronizes image capture times when the plurality of images are captured; image correction units that parallelize and output the plurality of images captured by the stereo image capture unit; a parallax measurement unit that detects parallax on the basis of the images output by the image correction units; delay amount holding units that each hold, pixel by pixel, delay times from the image capture times synchronized by the synchronization unit; a movement information acquisition unit that acquires movement information of the stereo image capture unit or a vehicle on which the stereo image capture unit is mounted; and a parallax image correction unit that corrects the parallax measured by the parallax measurement unit on the basis of the delay times held by the delay amount holding units and the movement information acquired by the movement information acquisition unit.

The stereo image capture unit is a rolling shutter system, and the object parallax correction unit corrects an error of the parallax accompanying a lateral speed of the stereo image capture unit.

Further, the parallax is corrected when the lateral speed of the stereo image capture unit is larger than a predetermined value.

Further, there is provided a stereo image processing device including a stereo image capture unit that captures a plurality of images with different viewpoints; a synchronization unit that synchronizes image capture times when the plurality of images are captured; image correction units that parallelize and output the plurality of images captured by the stereo image capture unit; a parallax measurement unit that detects parallax on the basis of the images output by the image correction units; delay amount holding units that each hold, pixel by pixel, delay times from the image capture times synchronized by the synchronization unit; a movement information acquisition unit that acquires movement information of the stereo image capture unit or a vehicle on which the stereo image capture unit is mounted; a parallax image correction unit that corrects the parallax measured by the parallax measurement unit on the basis of the delay times held by the delay amount holding units and the movement information acquired by the movement information acquisition unit; an object detection unit that detects a solid object using the images corrected by the parallax image correction unit; and an object parallax correction unit that corrects parallax of the solid object output by the object detection unit using the delay amount holding unit.

According to the above embodiments, it is possible to provide a stereo camera which accurately performs parallax caused by a lens distortion when imaging is performed by a rolling shutter system, and can output an accurate distance of an object even in a case where the camera moves laterally or an opponent moves in a lateral direction.

REFERENCE SIGNS LIST

101 stereo camera (stereo image capture unit)
212 synchronization signal generation unit (synchronization unit)
204 left image correction unit (image correction unit)
205 right image correction unit (image correction unit)
206 parallax image acquisition unit (parallax measurement unit)

207 object detection unit
208 left image delay time holding unit (delay amount holding unit)
209 right image delay time holding unit (delay amount holding unit)
210 object parallax correction unit

The invention claimed is:

1. A stereo image processing device comprising:
a stereo image capture unit that captures a plurality of images with different viewpoints;
a synchronization unit that synchronizes image capture times when the plurality of images are captured;
image correction units that parallelize and output the plurality of images captured by the stereo image capture unit;
a parallax measurement unit that detects parallax on the basis of the images output by the image correction units;
an object detection unit that detects an object on the basis of the parallax measured by the parallax measurement unit;
delay amount holding units that each hold, pixel by pixel, delay times from the image capture times synchronized by the synchronization unit; and
an object parallax correction unit that corrects the parallax of the object detected by the object detection unit using as an input the delay times held by the delay amount holding units, which hold on a pixel-by-pixel basis, the delay times from the imaging time synchronized by the synchronization unit, wherein
the delay times are calculated using $\Delta L(x1,y1)=\alpha*y1+\beta*x1$, in which $\alpha$ is a time required to image one line of the image before correction, $\beta$ is a time required to image one pixel x1 is a position along an x coordinate and y1 is a position along a v-coordinate.

2. The stereo image processing device according to claim 1, wherein
the stereo image capture unit is a rolling shutter system, and
the object parallax correction unit corrects a parallax measurement error accompanying a lateral speed of the object detected by the object detection unit.

3. The stereo image processing device according to claim 1, wherein the object parallax correction unit considers that point groups of the parallax detected by the object detection unit have the same lateral speed.

4. The stereo image processing device according to claim 1, wherein the delay amount holding unit performs calculation on the basis of an output of the image correction unit.

5. A stereo image processing device comprising:
a stereo image capture unit that captures a plurality of images with different viewpoints;
a synchronization unit that synchronizes image capture times when the plurality of images are captured;
image correction units that parallelize and output the plurality of images captured by the stereo image capture unit;
a parallax measurement unit that detects parallax on the basis of the images output by the image correction units;
delay amount holding units that each hold, pixel by pixel, delay times from the image capture times synchronized by the synchronization unit;
a movement information acquisition unit that acquires movement information of the stereo image capture unit or a vehicle on which the stereo image capture unit is mounted; and
a parallax image correction unit that corrects the parallax of the object measured by the parallax measurement unit using as an input the delay times held by the delay amount holding units, which hold, on a pixel-by-pixel basis, the delay times from the imaging time synchronized by the synchronization unit, and the movement information acquired by the movement information acquisition unit, wherein
the delay times are calculated using $\Delta L(x1,y1)=\alpha*y1+\beta*x1$, in which $\alpha$ is a time required to image one line of the image before correction, $\beta$ is a time required to image one pixel x1 is a position along an x coordinate and y1 is a position along a y-coordinate.

6. The stereo image processing device according to claim 5, wherein
the stereo image capture unit is a rolling shutter system, and
the object parallax correction unit corrects an error of the parallax accompanying a lateral speed of the stereo image capture unit.

7. The stereo image processing device according to claim 6, wherein the parallax is corrected when the lateral speed of the stereo image capture unit is larger than a predetermined value.

8. A stereo image processing device comprising:
a stereo image capture unit that captures a plurality of images with different viewpoints;
a synchronization unit that synchronizes image capture times when the plurality of images are captured;
image correction units that parallelize and output the plurality of images captured by the stereo image capture unit;
a parallax measurement unit that detects parallax on the basis of the images output by the image correction units;
delay amount holding units that each hold, pixel by pixel, delay times from the image capture times synchronized by the synchronization unit;
a movement information acquisition unit that acquires movement information of the stereo image capture unit or a vehicle on which the stereo image capture unit is mounted;
a parallax image correction unit that corrects the parallax of the object measured by the parallax measurement unit using as an input the delay times held by the delay amount holding units, which hold, on a pixel-by-pixel basis, the delay times from the imaging time synchronized by the synchronization unit, and the movement information acquired by the movement information acquisition unit;
an object detection unit that detects a solid object using the images corrected by the parallax image correction unit; and
an object parallax correction unit that corrects parallax of the solid object output by the object detection unit using the delay amount holding unit, wherein
the delay times are calculated using $\Delta L(x1,y1)=\alpha*y1+\beta*x1$, in which $\alpha$ is a time required to image one line of the image before correction, $\beta$ is a time required to image one pixel x1 is a position along an x coordinate and y1 is a position along a v-coordinate.

* * * * *